H. N. NELSON.
TRANSMISSION GEARING.
APPLICATION FILED JUNE 7, 1913.

1,188,815.

Patented June 27, 1916
3 SHEETS—SHEET 1.

WITNESSES

INVENTOR
Hedwin N. Nelson,
his Attorney

H. N. NELSON.
TRANSMISSION GEARING.
APPLICATION FILED JUNE 7, 1913.

1,188,815.

Patented June 27, 1916.
3 SHEETS—SHEET 3.

UNITED STATES PATENT OFFICE.

HEDWIN N. NELSON, OF WHEELER, WASHINGTON.

TRANSMISSION-GEARING.

1,188,815.  Specification of Letters Patent.  Patented June 27, 1916.

Application filed June 7, 1913. Serial No. 772,370.

*To all whom it may concern:*

Be it known that I, HEDWIN N. NELSON, a citizen of the United States, residing at Wheeler, in the county of Grant and State of Washington, have invented certain new and useful Improvements in Transmission-Gearing, of which the following is a specification.

My invention relates to improvements in transmission gearing.

The main object of the invention is to provide gearing of such type that it may be used to positively drive a laterally turnable wheel, especially the turnable front wheels of an automobile or other self-propelled or power driven vehicle.

Another object of the invention is to provide gearing of such type that the axle or wheel supporting means of a vehicle of the type set forth may yield vertically according to the evenness of the road surface traversed or obstructions encountered thereon.

Other objects mostly minor in nature will appear hereinafter from the description following taken in connection with the accompanying drawings.

Figure 1:
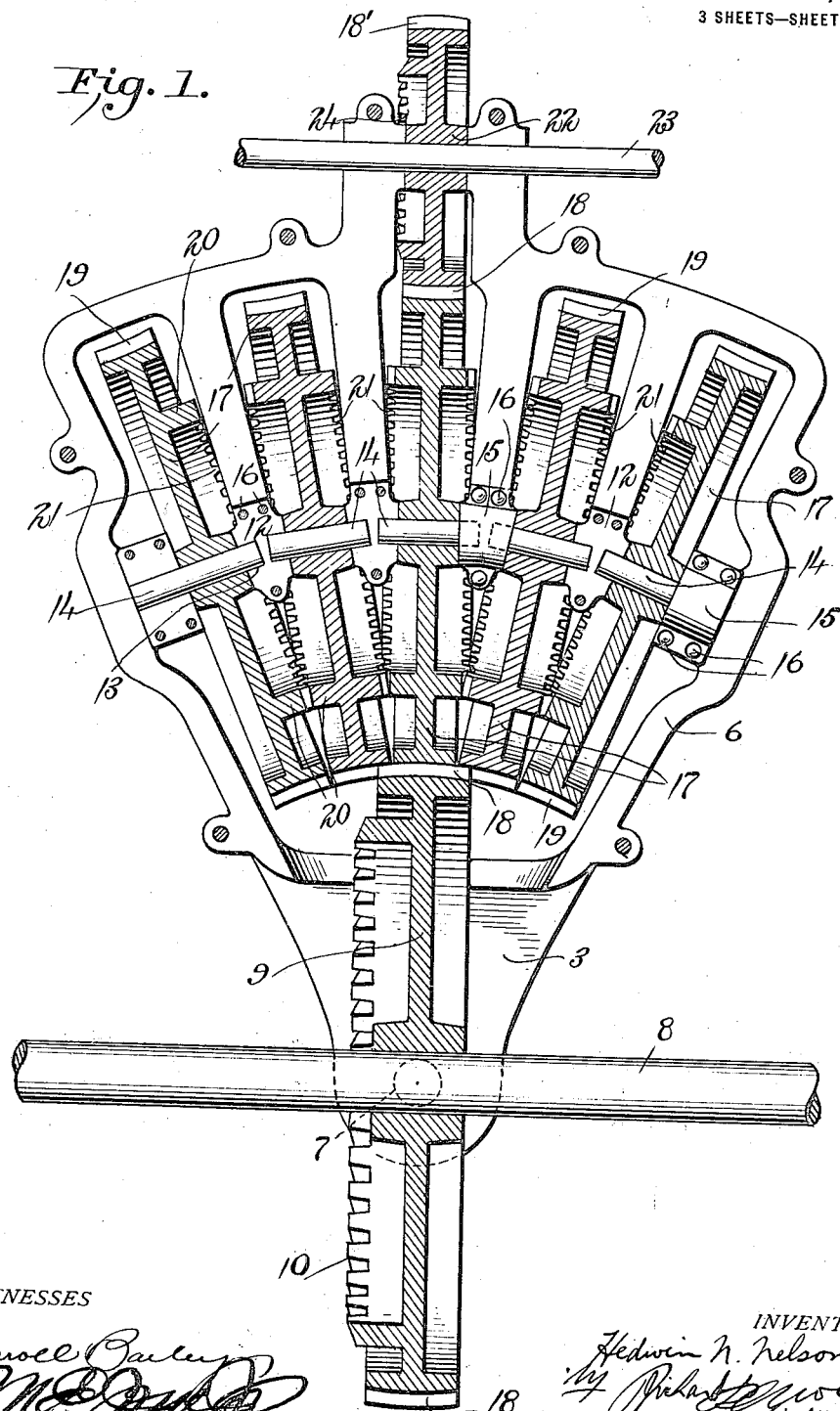
Figure 2:
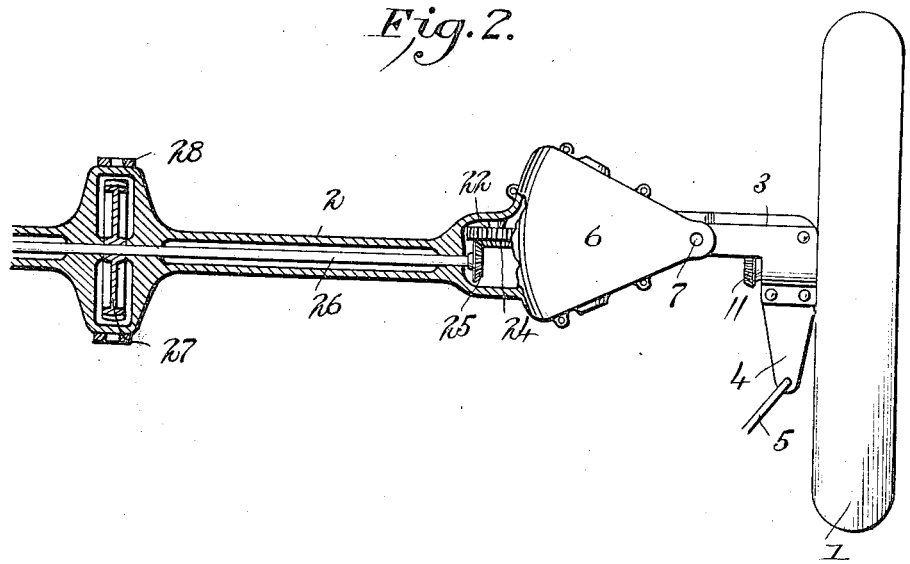
Figure 3:
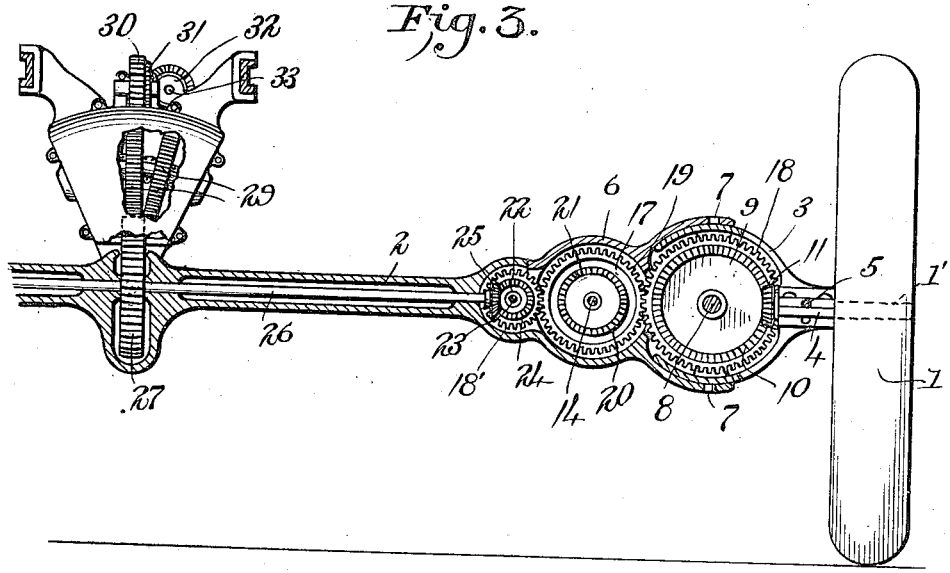
Figure 4:
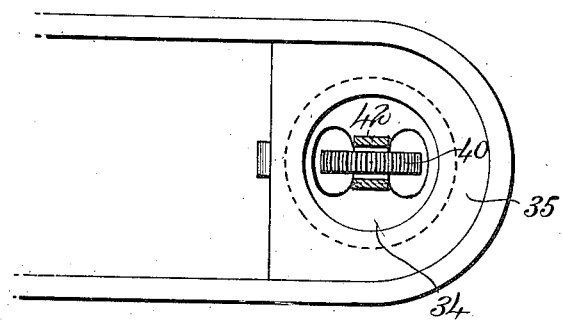
Figure 5:
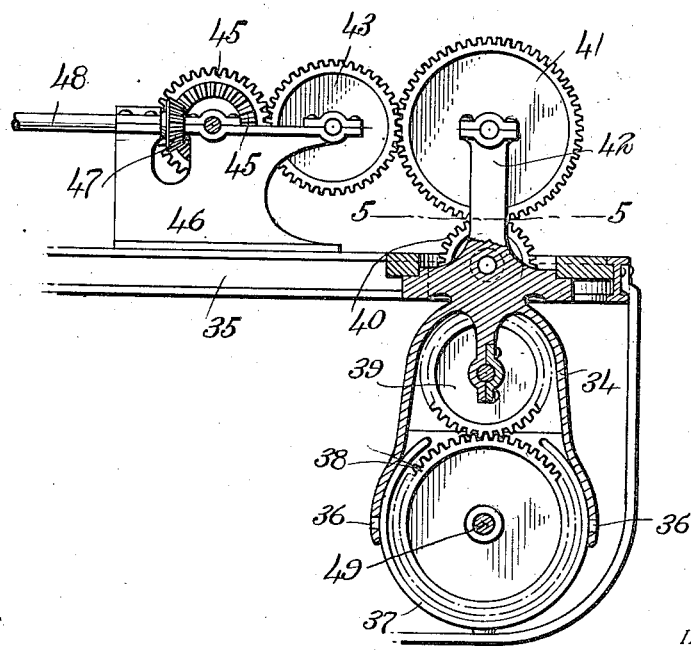

In said drawings:—Figure 1 is a view showing my improved gearing in horizontal section; Fig. 2 is a view partly in plan and partly in section illustrating the gearing as applied to the front wheel of an automobile or self-propelled vehicle; Fig. 3 is a view partly in elevation and partly in section of the parts of Fig. 2; Fig. 4 is a cross sectional view on the line 5—5 of Fig. 5; and Fig. 5 is a vertical sectional view showing the gearing applied to proper parts of a tractor.

Throughout the various views of the drawings, like reference characters designate like or corresponding parts.

Referring specifically to the drawings, and first to the device shown in Figs. 1 to 4 inclusive, 1 designates a front wheel of an automobile which is mounted to turn laterally as well as revolve, with respect to a transverse axle supporting member 2. The wheel 1 has its axle 1' journaled in a suitable casing or bearing 3. Said casing or bearing is provided with a crank 4 to which is fastened a rod 5 forming part of the steering mechanism for the vehicle to which the improvements are attached. The ends of the supporting member 2 are formed into suitable casings or housings 6. Part of the casing 3 extends in the housing 6 and is pivoted to turn laterally relatively thereto by means of the trunnions or pivot members 7 provided on the bearing 3 and entering suitable openings in the housing 6. Journaled transversely of the turnable casing 3 is a shaft 8 on which is keyed or otherwise mounted a laterally shiftable driving gear wheel 9. This gear wheel 9 has provided on one side face thereof an annular rim formed into gear teeth at 10. Shaft 2 has mounted thereon a bevel gear wheel 11 whose teeth are adapted to mesh with the teeth 10 so that motion from the wheel 9 will be imparted to the shaft 2 and accordingly to the wheel 1.

Housing 6 is so constructed as to provide bearings 12 having sockets 13 in which are journaled stud shafts 14 each arranged at an angle with respect to the other. The shafts are adapted to be positively fastened to the bearings 12 by means of bearing plates 15 and fastening members such as bolts 16 engaging the bearings 12 and plates 15. On each shaft 14 is keyed or otherwise mounted a gear wheel generally designated 17. By reason of the fact that the gear wheels 17 are mounted on the angularly disposed shafts 14, the same are mounted at an angle to each other and substantially in the path of an arc of a circle and so that their side faces which are adjacent the gear wheel 9 will be practically in contiguity. It is to be noted that the gear wheel 9 and gear wheels 17 have provided on their outer rims teeth respectively designated 18 and 19. It is further to be noted that the outer ends or faces of the teeth 18 and 19 and the walls at the base of the notches between them are curved or arcuate, the faces of teeth 18 referred to being convex and those of the teeth 19 referred to being concave. In this way the faces of the teeth 18 and 19, as best seen in Fig. 3, lie in the path of a circle so that upon the gear 9 being shifted laterally, they may positively and effectively engage the teeth of either gear wheel 17 if desired.

Each gear wheel 17 on one side thereof is provided with an annular rim 20 the outer edge of which is formed into gear teeth at 21. The gear teeth 21 of the different gears 17 intermesh so that all of the gear wheels 17 will revolve or turn as a unit.

In mesh with the teeth 19 of one gear wheel 17, are the teeth 18' shaped similarly to the teeth 18, of a driving gear wheel 22, said gear wheel 22 being keyed or fastened to a shaft 23 extending transversely of the housing 6. This gear wheel 22 is provided with a side rim having gear teeth at 24. The teeth of a bevel gear wheel 25 are adapted to mesh with the teeth 24, and a shaft 26 journaled on the supporting member 2 carries the bevel gear wheel 25. Said shaft 26 is adapted to be driven in any suitable manner from the engine or power unit propelling an automobile or other self-propelled vehicle.

This gearing as previously stated, provides an effective means whereby the front wheels of an automobile or other self-propelled vehicle may be positively driven. This feature is especially desirable when a machine is stranded. While stranded, as will be realized, one or more of the wheels are in contact with the ground and if means is provided to positively drive said ground contacting wheels, the chances for the machine becoming stranded are greatly reduced or minimized. In the operation of the parts, shaft 26 being driven imparts motion to the gear wheel 22 through the meshing of teeth 24 with those of bevel gear wheel 25. In turn the gear wheels 17 are driven as a unit, due to the construction shown and described through the meshing of teeth 18 with the teeth 19 of one of the gear wheels 17.

Motion from the gear wheels 17 is in turn imparted to the gear wheel 9 through the inter-meshing of teeth 18 and 19. The gear wheel 9, as will be realized, is shifted as the front wheel 1 is shifted laterally through the adjustment of the steering mechanism of which members 4 and 5 form parts. At all times during the shifting of gear wheel 9 due to the arrangement of the gear wheels 17 in an arcuate path, the gear wheel 9 being pivoted as shown, and the particular shape of the teeth 18 and 19, positively causes the driving of gear wheel 9. In turn the axle 2 due to the engagement of the teeth 10 with those of bevel gear wheel 11, causes the wheel 1 to be positively turned at all times and especially during the shifting laterally of said wheel.

The same system of gearing described may be used as a yieldable supporting means for a vehicle axle or wheel supporting member such as that designated 2, which application of the gearing is best shown in Figs. 3 and 4. As seen in said figures, shaft 26 has keyed or otherwise fastened thereon a shiftable gear wheel 27 and is the equivalent of the gear wheel 9. Axle member 2 forms the shiftable bearing for the shaft of gear 27, being the equivalent of the bearing 3 and having pivoted thereto a housing 28, the equivalent of housing 6. In the housing 28 are mounted a series of gear wheels 29 which are disposed at an angle to each other and a gear wheel 30. Said gear wheels 27, 29 and 30 are the equivalent of and have formed on their periphery teeth similar in shape to those of the gear wheels 9, 17 and 22. Gear wheel 30 has provided on one side thereof an annular row of gear teeth 31 with which mesh the gear teeth of a bevel gear wheel 32 carried by a shaft 33, which preferably receives its power from the driving engine of the vehicle through any approved connection. This means just described preferably is the one employed to drive the shaft 26. It might be more definitely stated however, that the gear wheel 32 drives the gear wheel 30, in turn driving the gear wheels 29 and then the gear wheel 27 and the shaft 26.

With the last mentioned arrangement of the gearing and parts, upon the wheels 1 tilting, due to the engagement of an obstruction or uneven surface of a road, will accordingly tilt the wheel supporting member 22 and shaft 26 thereby shifting the shaft 26. As the shaft 26 shifts, it of course remains in engagement with one of the gear wheels 29 so as to be positively driven at all times thereby. The arcuate formation of the teeth of the gear wheels 27 and 29, of course permits the vertical movement of the member 22 and allied parts just referred to.

In Figs. 5 and 6 the same system of gearing is shown as employed for driving the wheels, preferably the front wheels of the tractor or traction engine. As instanced in said figures, a turnable housing 34 is mounted from suitable framework 35 of the tractor. This housing forms the equivalent of housing 6 and has pivoted thereto as by means of the trunnions 36, a turnable housing 37 in which is carried a driving gear wheel 38. This gear wheel 38 is adapted to mesh with either of a series of angularly disposed gear wheels 39 mounted in the housing 34 and being shaft-like and forming the equivalent of the series of gear wheels 17. A driven gear wheel is also mounted in the housing 34 and is designated 40. In mesh with the gear wheel 40 is a driving gear wheel 41 supported by a shaft suitably journaled in a bracket 42 formed on housing 34. A series of the angularly disposed gear wheels is shown at 43 with which is adapted to mesh the gear wheel 41. The driven gear wheel in mesh with one of the gear wheels 43 is designated 44 and provided on its side with an annular row of gear teeth 46 with which mesh the teeth of the bevel gear wheel 47 carried by a shaft 48. In this latter embodiment, the shaft 48 is driven in any approved manner from the driving engine of the vehicle, and in turn through the bevel gear 47, and teeth 46 impart motion to gear wheel 45 which in turn imparts motion to the series of gear wheels 43, and the latter imparting motion to the gear wheel 41. Due to the turnable mounting of the housing 34, the gear wheel 41 is turnable relatively to the series of gears 43 which construction permits the housing and axle of the tractor carried by parts supported thereby, to turn laterally. From the gear wheel 41 motion to the series of gear wheels 39 is imparted through the gear wheel 40. From gear wheel 39 the gear wheel 38 receives motion and in turn imparts it to the axle of the tractor, which preferably forms the axle or shaft for the gear wheel 38 which may be designated 49. As thus mounted, the axle 49 may tilt in a vertical plane upon encountering obstructions, and of course shifts the gear wheel 38 whose teeth always remain in mesh with the teeth of one or more of the gear wheels 39, whereby the axle 49 is at all times positively driven.

It is to be understood that the foregoing are merely applications of ways in which the improved system of gearing may be utilized, in view of which fact changes such as fall within the spirit and scope of the appended claims are reserved.

Having thus described my said invention, what I claim as new and desire to secure by Letters Patent is:—

1. In gearing, a plurality of gears having inter-meshing teeth, means to drive said gears, and a laterally turnable gear in driving relation to one of said gears.

2. In gearing, a plurality of gears having their axes substantially in the path of a circle, means to drive said gears, and a shiftable gear engageable with either of said gears.

3. In gearing, a plurality of gears provided with lateral inter-meshing teeth, said gears also provided with peripheral teeth, a pivoted gear engageable with either of said gears provided with peripheral teeth to engage said teeth, the peripheral teeth of each of said gears at the outer face thereof being curved.

4. In gearing, a plurality of shafts mounted at an angle to each other, a gear wheel on each shaft, said gear wheels mounted to drive one from the other, said gears provided with teeth having curved faces, and a gear pivoted to turn laterally provided with teeth having curved walls adapted to interengage with said teeth.

5. In gearing, a plurality of gears having inter-meshing teeth and provided with peripheral teeth, and means to drive said gears, a laterally turnable gear wheel provided with peripheral teeth engageable with said peripheral teeth, gear teeth provided on one face of said turnable gear, and, a gear having teeth in mesh with said last mentioned teeth.

6. In a gear transmission mechanism, a plurality of gears having corresponding portions thereof contiguous and radiating from each other away from said contiguous portions, a gear laterally turnable for meshing engagement with said gears, and means for imparting motion to said plurality of gears.

7. In a power transmission mechanism, a plurality of transmitting gears mounted upon and rotatable about a plurality of axes disposed to cause the gears to operatively engage laterally, said gears having laterally disposed teeth for mesh engagement to drivingly connect the gears with each other, and said gears having peripheral teeth, and a gear adjustable about an axis angular to its axis of rotation for mesh engagement with said transmitting gears in any position in which said adjustable gear might be adjusted.

8. In a power transmission mechanism, a driven rotatable member adjustable about an axis angular to its axis of rotation, a plurality of transmission members radially disposed about the center of adjustment of said driven member and arranged for peripheral driving engagement therewith throughout its adjustment, said transmission members having lateral driving engaging portions for rotating one member by the rotation of the other, and means for rotating said transmission members.

9. In a power transmission mechanism, a driven member adjustable about an axis angular to its axis of rotation, a plurality of transmission members radially disposed about the center of adjustment of said driven member and having peripheral driving engagement therewith, said transmission members having portions thereof operatively engaged for imparting motion from one to the other, and means for imparting rotation to one of said transmission members.

In testimony whereof I affix my signature in presence of two witnesses.

HEDWIN N. NELSON.

Witnesses:
F. W. CLARK,
F. R. ROBERTSON.